(12) United States Patent
Spyrou et al.

(10) Patent No.: US 8,222,312 B2
(45) Date of Patent: Jul. 17, 2012

(54) METHOD FOR PRODUCING RADIATION CURABLE FORMULATIONS WITH INCREASED CORROSION PROTECTION ON METAL SUBSTRATES, AND FORMULATIONS OF THIS TYPE

(75) Inventors: Emmanouil Spyrou, Schermbeck (DE); Marion Ebbing-Ewald, Marl (DE)

(73) Assignee: Evonik Degussa GmbH, Essen (DE)

( * ) Notice: Subject to any disclaimer, the term of this patent is extended or adjusted under 35 U.S.C. 154(b) by 211 days.

(21) Appl. No.: 11/993,903

(22) PCT Filed: May 12, 2006

(86) PCT No.: PCT/EP2006/062286
§ 371 (c)(1),
(2), (4) Date: Dec. 26, 2007

(87) PCT Pub. No.: WO2007/003462
PCT Pub. Date: Jan. 11, 2007

(65) Prior Publication Data
US 2008/0200577 A1   Aug. 21, 2008

(30) Foreign Application Priority Data
Jul. 5, 2005  (DE) .................. 10 2005 031 271

(51) Int. Cl.
B29C 71/04 (2006.01)
B01J 19/12 (2006.01)
C08G 18/67 (2006.01)
C03C 25/10 (2006.01)
C08F 283/00 (2006.01)
B05D 3/00 (2006.01)
C08F 2/50 (2006.01)

(52) U.S. Cl. .................. 522/3; 522/90; 522/91; 522/92; 522/93; 522/33; 522/105; 427/195

(58) Field of Classification Search .......... 522/1, 90–93, 522/33; 427/195
See application file for complete search history.

(56) References Cited

U.S. PATENT DOCUMENTS

| 5,091,211 A * | 2/1992 | Richard .................. 427/519 |
| 5,128,387 A | 7/1992 | Shustack |
| 5,616,630 A | 4/1997 | Heinze |
| 5,885,341 A | 3/1999 | Standke et al. |
| 6,562,464 B1 * | 5/2003 | Schwalm et al. .......... 428/411.1 |
| 6,747,070 B2 | 6/2004 | Wenning et al. |
| 6,825,240 B2 | 11/2004 | Wenning et al. |
| 6,855,792 B2 | 2/2005 | Speier et al. |
| 6,861,465 B2 | 3/2005 | Wenning et al. |
| 6,924,385 B2 | 8/2005 | Lettmann et al. |
| 6,960,620 B2 | 11/2005 | Wenning et al. |
| 2002/0099127 A1 * | 7/2002 | Wenning et al. .............. 524/451 |
| 2008/0039593 A1 | 2/2008 | Glockner et al. |

FOREIGN PATENT DOCUMENTS

| EP | 1 323 758 | 7/2003 |
| WO | 00 50527 | 8/2000 |
| WO | 03 008508 | 1/2003 |

OTHER PUBLICATIONS

U.S. Appl. No. 11/631,392, filed Nov. 21, 2007, Gloeckner, et al.
U.S. Appl. No. 11/577,415, filed Apr. 18, 2007, Gloeckner, et al.
U.S. Appl. No. 11/574,197, filed Feb. 23, 2007, Gloeckner, et al.
U.S. Appl. No. 11/577,139, filed Apr. 12, 2007, Gloeckner, et al.
U.S. Appl. No. 12/159,673, filed Jun. 30, 2008, Gloeckner, et al.
U.S. Appl. No. 12/440,927, filed Mar. 12, 2009, Spyrou, et al.
U.S. Appl. No. 12/520,873, filed Jun. 23, 2009, Spyrou, et al.
U.S. Appl. No. 12/933,028, filed Sep. 16, 2010, Spyrou.
U.S. Appl. No. 12/673,390, filed Feb. 12, 2010, Wassmer, et al.
U.S. Appl. No. 12/673,289, filed Feb. 12, 2010, Koschabek, et al.
U.S. Appl. No. 12/161,112, filed Jul. 16, 2008, Standke, et al.
U.S. Appl. No. 12/675,057, filed Feb. 24, 2010, Spyrou, et al.

* cited by examiner

*Primary Examiner* — Mark Eashoo
*Assistant Examiner* — Jessica Paul
(74) *Attorney, Agent, or Firm* — Oblon, Spivak, McClelland, Maier & Neustadt, L.L.P.

(57) ABSTRACT

The invention relates to radiation-curable formulations which contain adhesion promoters containing phosphoric acid and which in the cured state afford a particular degree of corrosion control for metallic substrates, and to a process for preparing them.

39 Claims, No Drawings

METHOD FOR PRODUCING RADIATION CURABLE FORMULATIONS WITH INCREASED CORROSION PROTECTION ON METAL SUBSTRATES, AND FORMULATIONS OF THIS TYPE

The invention relates to radiation-curable formulations which contain adhesion promoters containing phosphoric acid and which in the cured state afford a particular degree of corrosion control for metallic substrates, and to a process for preparing them.

Radiation-curable formulations are known.

Ethylenically unsaturated prepolymers are described for example in P. K. T. Oldring (ed.), "Chemistry and Technology of UV and EB Formulations for Coatings, Inks and Paints", Vol. II. SITA Technology, London 1991, based for example on epoxy acrylates (pages 31 to 68), urethane acrylates (pages 73 to 123), and melamine acrylates (pages 208 to 214). Formulations of this kind are frequently mentioned in the patent literature as well; by way of example mention may be made of JP 62110779 and EP 947 565.

The coating of metallic substrates poses a particular problem for radiation-curable formulations, since processes of contraction may result in a loss of cohesion. For such substrates it is therefore common to use adhesion promoters containing phosphoric acid. Examples thereof are U.S. Pat. No. 5,128,387 (coating of beer cans) and JP2001172554 (coating of various cans).

On the other hand it is also known that adhesion promoters containing phosphoric acid may have an adverse effect on corrosion resistance.

It was an object, therefore, to find radiation-curable formulations, and a process for preparing them, which on the one hand adhere well to metal but on the other hand also exhibit outstanding corrosion control.

Surprisingly it has been found that the corrosion resistance of coating materials based on radiation-curable formulations which contain adhesion promoters containing phosphoric acid increases drastically on metallic substrates if the formulation in question is first thermally conditioned for a while prior to application.

The present invention provides a radiation-curable formulation composed of
A) radiation-curable resins,
B) radiation-curable reactive diluents,
C) adhesion promoters containing phosphoric acid,
D) optionally photoinitiators,
E) optionally pigments,
F) optionally other adjuvants,
obtained by first thermally conditioning the formulation at a temperature of from 40 to 100° C. for from 30 minutes to 48 hours, prior to application and curing.

In principle it is possible to use all radiation-curable resins. Their preparation is described for example in "Radiation Curing in Polymer Science & Technology, Vol I: Fundamentals and Methods" by J. P. Fouassier, J. F. Rabek, Elsevier Applied Science, London and New York, 1993, Chapter 5, pages 226 to 236, in "Lackharze", D. Stoye. W. Freitag, Hanser-Verlag, Vienna, 1996, and in EP 0 947 565.

Occupying a special position among radiation-curable resins, and particularly suitable in accordance with the invention, are urethane polyester acrylates, on account of their particularly good mechanical and weather-stability properties. Urethane polyester acrylates are described for example in U.S. Pat. No. 5,719,227.

Especially suitable urethane polyester acrylates are composed of a hydroxyl-containing polyester to which urethane groups and acrylate groups are attached by reaction with polyisocyanates and acrylate-containing alcohols.

Urethane polyester acrylates are prepared from hydroxyl-containing polyesters by reaction with polyisocyanates and with a compound which simultaneously contains at least one alcohol group and at least one polymerizable acrylate group. They contain both urethane groups and terminal acrylate groups.

Hydroxyl-containing polyesters are prepared by polycondensation of suitable dicarboxylic acids and diols. The condensation is accomplished in conventional fashion in an inert gas atmosphere at temperatures from 100 to 260° C., preferably from 130 to 220° C., in the melt or azeotropically, as described for example in Methoden der Organischen Chemie (Houben-Weyl); Volume 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961. The carboxylic acids preferred for the preparation of polyesters may be aliphatic, cycloaliphatic, aromatic and/or heterocyclic in nature and may if desired be substituted by halogen atoms and/or unsaturated. Examples thereof that may be mentioned include the following: succinic, adipic, suberic, azelaic, sebacic, phthalic, terephthalic, isophthalic, trimellitic, pyromellitic, tetrahydrophthalic, hexahydrophthalic, hexahydroterephthalic, dichlorophthalic, tetrachlorophthalic, endomethylenetetrahydrophthalic, glutaric or 1,4-cyclohexanedicarboxylic acid or—where obtainable—their anhydrides or esters. Particular suitability is possessed by isophthalic acid, terephthalic acid, hexahydroterephthalic acid, and 1,4-cyclohexanedicarboxylic acid.

Examples of suitable polyols include monoethylene glycol, 1,2- and 1,3-propylene glycol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, 3(4),8(9)-bis(hydroxymethyl)tricyclo[5.2.1.0$^{2,6}$]decane (Dicidol), 1,4-bis(hydroxymethyl)cyclohexane, 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, glycerol, trimethylolpropane, trimethylolethane, hexane-1,2,6-triol, butane-1,2,4-triol, tris(β-hydroxyethyl) isocyanurate, pentaerythritol, mannitol, and sorbitol, and also diethylene glycol, triethylene glycol, tetraethylene glycol, dipropylene glycol, polypropylene glycols, polybutylene glycols, xylylene glycol, and neopentyl glycol hydroxypivalate. Preference is given to monoethylene glycol, neopentyl glycol, Dicidol, cyclohexanedimethanol, trimethylolpropane, and glycerol.

Polyesters prepared in this way have an OH number of from 15 to 750 mg KOH/g. Mixtures of polyesters can also be used.

Polyisocyanates used for preparing urethane polyester acrylates are diisocyanates of aliphatic, (cyclo)aliphatic or cycloaliphatic structure. Representative examples of the polyisocyanates are 2-methylpentamethylene 1,5-diisocyanate, hexamethylene diisocyanate, trimethylhexamethylene 1,6-diisocyanate, in particular the 2,2,4 isomer and the 2,4,4 isomer, and technical mixtures of both isomers, 4,4'-methylenebis(cyclohexyl isocyanate), norbornane diisocyanate, and 3,3,5-trimethyl-1-isocyanato-3-isocyanatomethylcyclohexane (IPDI). Likewise highly suitable are polyisocyanates obtainable by reacting polyisocyanates with themselves via isocyanate groups, such as isocyanurates; which come about through reaction of three isocyanate groups. The polyisocyanates may likewise contain biuret or allophanate groups. IPDI is especially suitable.

Examples of suitable polymerizable compounds having at least one free OH group and a polymerizable acrylate group include hydroxyethyl acrylate (HEA), hydroxypropyl acrylate, hydroxybutyl acrylate, and glyceryl diacrylate. Particular suitability is possessed by hydroxyethyl acrylate (HEA).

To prepare the urethane polyester acrylate from the amorphous, OH-containing polyesters, polyisocyanates, and the acrylate-containing component, the polyisocyanate is introduced first of all, admixed with DBTL as catalyst and IONOL CP (Shell) as polymerization inhibitor, and the polyester is added in an NCO:OH ratio of from 2.5 to 1.5:1. Thereafter the acrylate-containing component, hydroxyethyl acrylate for example, is added to the reaction product in a residual-NCO:OH ratio of from 1.0 to 1.1:1, and the reaction is taken to completion at 40 to 120° C., to give an NCO content of below 0.1%. It is also possible to subject a polyisocyanate, IPDI for example, to preliminary reaction with the acrylate-containing component, and to add this NCO-containing precursor to the hydroxyl-containing polyester.

The amount of A) in the formulation varies from 5% to 95% by weight, preferably from 10% to 70% by weight.

Radiation-curable reactive diluents B) and their preparation are described for example in "Radiation Curing in Polymer Science & Technology, Vol I: Fundamentals and Methods" by J. P. Fouassier, J. F. Rabek, Elsevier Applied Science, London and New York, 1993, Chapter 5, pages 237 to 240. Generally speaking they are acrylate- or methacrylate-containing substances which are liquid at room temperature and hence able to lower the overall viscosity of the formulation. Examples of such products are hexanediol diacrylate, isobornyl acrylate, hydroxypropyl methacrylate, dipropylene glycol diacrylate, tripropylene glycol diacrylate, trimethylolpropane formal monoacrylate, trimethylenepropane triacrylate, tetrahydrofurfuryl acrylate, phenoxyethyl acrylate, lauryl acrylate, pentaerythrityl tetraacrylate, and also urethanized reactive diluents such as Ebecryl 1039 (UCB), and others. Examples of manufacturers of such products include UCB, Sartomer, BASF, Rahn, Akzo, and others. The amount of B) in the formulation is from 5% to 90% by weight. Additionally suitable are other liquid components which are capable of undergoing reaction as well under conditions of free-radical polymerization, examples including vinyl ethers or allyl ethers.

Adhesion promoters C) for radiation-curable formulations for metallic substrates are composed in general of reaction products (esters, for example) of phosphoric acid and alcohol-functionalized acrylates. While the three phosphoric acid groups are responsible for direct adhesion to the metal, the acrylate groups ensure integration with the matrix of the coating. Products of this kind are also described in WO 01/98413, in JP 08231564, and in JP 06313127.

Typical commercial products are Ebecryl 169 and 170 from UCB, Alditol Vx1 6219 from Vianova, CD 9050 and CD 9052 from Sartomer, Sipomer PAM-100, Sipomer PAM-200 and Sipomer PAM-300 from Rhodia, and Genorad 40 from Rahn. The amount of B) in the formulation is from 0.1% to 10% by weight.

Photoinitiators D) and their preparation are described for example in "Radiation Curing in Polymer Science & Technology, Vol II: Photoinitiating Systems" by J. P. Fouassier, J. F. Rabek, Elsevier Applied Science, London and New York, 1993. An example of a photoinitiators manufacturer is Ciba, and they can be present in amounts of from 0.2% to 10% by weight.

Suitable pigments E) in radiation-curable formulations are described for example in "Radiation Curing in Polymer Science & Technology, Vol IV: Practical Aspects and Application" by J. P. Fouassier, J. F. Rabek, Elsevier Applied Science, London and New York, 1993, Chapter 5, pages 87 to 105, and they can be present in amounts of from 1% to 40% by weight.

Examples of anticorrosion pigments are found for example in Pigment+Füllstoff Tabellen, O. Lückert, Vincentz Verlag, Hanover, 6th edition 2002. The following may be mentioned by way of example: Shieldex C 303 (Grace Davison) and Halox Coil X 100, Halox Coil X 200, and Halox CW 491 (Erbslöh), Heucophos SAPP (Heubach), K-White TC 720 (Tayca), and Hombicor (Sachtleben). Of course, simple inorganic salts are also suitable, such as zinc phosphate.

Adjuvants F) for radiation-curable formulations are available in various compositions and for a variety of purposes, examples including flow control agents, matting agents, devolatilizers, and others.

Some of them are described in the brochure "SELECTED DEGUSSA PRODUCTS FOR RADIATION CURING AND PRINTING INKS", published by Tego Coating & Ink Additives, Essen, 2003. Another manufacturer of such products, for example, is Byk. The amount of F) varies from 0.01% to 5% by weight, if present.

The invention also provides a process for preparing radiation-curable formulations with enhanced corrosion control on metal substrates, which comprises obtaining a mixture composed of
A) radiation-curable resins,
B) radiation-curable reactive diluents,
C) adhesion promoters containing phosphoric acid,
D) optionally photoinitiators,
E) optionally pigments,
F) optionally other adjuvants,
by first thermally conditioning this mixture at a temperature of from 40 to 100° C. for from 30 minutes to 48 hours, prior to application and curing.

All of the ingredients (or parts thereof) are mixed intimately with one another in a suitable mixing assembly (e.g., stirred tank, Dispermat, static mixer, extruder or flow tube).

The mixing temperature can be from room temperature (20° C.), to 140° C., but generally does not exceed 80° C., and is preferably from 20 to 60° C.

Thermal conditioning may take place either in the whole formulation or else in constituents of said formulation necessarily containing the adhesion promoter containing phosphoric acid. Thermal conditioning constitutes storage at a temperature of from 40 to 100° C. for from 30 minutes to 48 hours. From 40 to 60° C. for from 2 to 8 hours is preferred. From 40 to 50° C. for from 4 to 8 hours is particularly preferred.

As is customary for powder coating materials, in the case of solid formulations the mixture is also ground and sieved prior to application.

Application may take place by the techniques that are known in coatings technology, examples being knifecoating, roller coating, spraying or injecting.

A particularly suitable metallic substrate is steel, with all of the various pretreatment methods, but also aluminum and other alloys provided with a coating for reasons of corrosion control.

Curing is accomplished in the presence of photoinitiators under a UV lamp, or in the absence of photoinitiators under electron beams. The properties of the cured coatings are almost identical irrespective of the curing method.

UV curing and UV lamps are described for example in "Radiation Curing in Polymer Science & Technology, Vol I: Fundamentals and Methods" by J. P. Fouassier, J. F. Rabek, Elsevier Applied Science, London and New York, 1993, Chapter 8, pages 453 to 503.

Electron beam curing and EBC sources are described for example in "Radiation Curing in Polymer Science & Technology, Vol I: Fundamentals and Methods" by J. P. Fouassier, J. F. Rabek, Elsevier Applied Science, London and New York, 1993, Chapter 4, pages 193 to 225, and in Chapter 9, pages 503 to 555.

The invention is elucidated below with reference to examples, but without being thereby restricted.

EXAMPLES

| Ingredients | Product description, manufacturer |
|---|---|
| IPDI | Isophorone diisocyanate, Degussa AG, Coatings & Colorants, NCO content: 37.8% |
| Hydroxyethyl acrylate | Röhm |
| EBC 1039 | Reactive diluent, monourethane acrylate, UCB |
| HPMA | Hydroxypropyl methacrylate, reactive diluent, Röhm |
| EBC 170 | Adhesion promoter containing phosphoric acid, UCB |
| IRGACURE 184 | Photoinitiator, Ciba |
| KRONOS 2160 | Titanium dioxide, Kronos |
| MICROTALKUM AT extra | Norwegian talc |
| AEROSIL | Dispersing assistant, Degussa AG, Füllstoffe und Pigmente |
| SHIELDEX C303 | Anticorrosion pigment, Grace |

1. Preparation Instructions for Hydroxyl-Containing Polyesters P 2626 g of adipic acid (acid component) and 2661 g of butanediol (alcohol component) were admixed with 0.2 percent by mass of n-butyltin trioctoate and this mixture was heated to 190° C., under nitrogen and with stirring, in an apparatus provided with a distillation column. Over the course of elimination of water, this temperature was slowly raised to 230° C. When about 98% of the theoretical amount of water had been removed by distillation, the product was cooled and found to have an OH number of 252 mg KOH/g. The acid number was 0.6 mg KOH/g.

2. Preparation of Urethane Acrylate BAB 37.3 g of the polyester (P) were melted and this melt was added in portions with vigorous stirring and at 80° C. to a mixture of 38.4 g of IPDI, 0.2 g of IONOL CP, and 0.1 g of DBTL. After 10 minutes' reaction, additionally, 24.0 g of hydroxyethyl acrylate were added dropwise. After a further 30 minutes' stirring the NCO content was below 0.1% and the hot reaction mixture was cooled.

3. Formulation, Application, Inventive Thermal Conditioning, and Curing

The urethane acrylate (BAB) was stirred together well with the other formulation ingredients. In the case of pigmented systems, in addition, the batch was dispersed in a Dispermat at 9000 rpm for 20 minutes. This was followed, in the case of the inventive experiments, by thermal conditioning in a drying oven (at 50° C. for 8 hours). Finally, the ready-to-use formulation was applied by knifecoating (40 μm film thickness) to steel panels (Q-Panel, R 36) and subsequently cured under a UV lamp (UV, Minicure, mercury vapor lamp, 80 W/cm, Tecnigraf) or under an electron beam source (EBC, Energy Sciences).

|  | 1 | I* | 2 | II* | 3 | III* |
|---|---|---|---|---|---|---|
| 1) Formula (% by wt) | | | | | | |
| Urethane acrylate BAB | 41 | 41 | 40 | 40 | 30 | 30 |
| EBC 1039 | 27 | 27 | 26 | 26 | 20 | 20 |
| HPMA | 27 | 27 | 26 | 26 | 20 | 20 |
| EBC 170 | 5 | 5 | 5 | 5 | 5 | 5 |
| IRGACURE 184 | | | 3 | 3 | | |
| Titanium dioxide | | | | | 10 | 10 |
| MICROTALKUM AT extra | | | | | 4.7 | 4.7 |
| AEROSIL | | | | | 0.3 | 0.3 |
| SHIELDEX C303 | | | | | 10 | 10 |
| 2) Thermal conditioning | yes | no | yes | No | yes | no |
| 3) Curing | EBC | EBC | UV | UV | EBC | EBC |
| 4) Corrosion resistance (DIN 53167) | | | | | | |
| Salt spray test [h] | 48 | 48 | 48 | 48 | 480 | 480 |
| Subfilm corrosion [mm] | 2.3 | 9.9 | 3.5 | 8.6 | 1.1 | 13.1 |

*Noninventive, comparative examples Thermal conditioning: 8 hours at 50° C.; UV: 2 m/min (belt speed); EBC: 15 Mrad It is clearly apparent that the thermally conditioned formulations ensure substantially greater corrosion control.

What is claimed is:

1. A solid radiation-curable thermally conditioned formulation comprising:
   A) at least one acrylate-substituted radiation-curable resin, wherein the acrylate is at least one (meth)acrylate group selected from the group consisting of ethyl acrylate, propyl acrylate, butyl acrylate, and glycidyl acrylate,
   B) at least one radiation-curable reactive diluent,
   C) at least one adhesion promoter comprising phosphoric acid,
   D) at least one UV photoinitiator,
   E) optionally at least one pigment,
   F) optionally at least one adjuvant,
   wherein said radiation-curable formulation is obtained by thermally conditioning the solid formulation at a temperature of from 40 to 60° C. for from 2 to 8 hours, prior to application and curing.

2. The radiation-curable thermally conditioned formulation as claimed in claim 1, wherein the acrylate-substituted radiation-curable resin is a urethane polyester acrylate A) prepared from at least one polyester having an OH number of from 15 to 750 mg KOH/g.

3. The radiation-curable thermally conditioned formulation as claimed in claim 1, comprising at least one polyester synthesized from succinic, adipic, suberic, azelaic, sebacic, phthalic, terephthalic, isophthalic, trimellitic, pyromellitic, tetrahydrophthalic, hexahydrophthalic, hexahydroterephthalic, dichlorophthalic, tetrachlorophthalic, endomethylenetetrahydrophthalic, glutaric acid, 1,4-cyclohexanedicarboxylic acid, an anhydride of the acid and an ester of said acid.

4. The radiation-curable thermally conditioned formulation as claimed in claim 3, comprising isophthalic acid, terephthalic acid, hexahydroterephthalic acid, and 1,4-cyclohexanedicarboxylic acid.

5. The radiation-curable thermally conditioned formulation as claimed in claim 1, comprising at least one polyester synthesized from monoethylene glycol, 1,2- and 1,3-propylene glycol, 1,4- and 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, 3(4),8(9)-bis(hydroxymethyl)tricyclo[5.2.1.0$^{2,6}$]decane, 1,4-bis(hydroxymethyl)cyclohexane, 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, glycerol, trimethylolpropane, trimethylolethane, hexane-1,2,6-triol, butane-1,2,4-triol, tris(β-hydroxyethyl) isocyanurate, pentaerythritol, mannitol, and sorbitol, and also diethylene glycol, triethylene glycol, tetraethylene glycol, dipropylene glycol, polypropylene glycols, polybutylene glycols, xylylene glycol, and neopentyl glycol hydroxypivalate.

6. The radiation-curable thermally conditioned formulation as claimed in claim 5, wherein the polyester is synthesized from at least one of monoethylene glycol, neopentyl glycol, 3(4),8(9)-bis(hydroxymethyl)tricyclo[5.2.1.0$^{2,6}$]decane, cyclohexanedimethanol, trimethylolpropane and glycerol.

7. The radiation-curable thermally conditioned formulation as claimed in claim 1, wherein the acrylate-substituted radiation-curable resin is a urethane polyester acrylate A) prepared from at least one diisocyanate selected from the group consisting of 2 methylpentamethylene 1,5-diisocyanate, hexamethylene diisocyanate trimethylhexamethylene 1,6-diisocyanate, 4,4'-methylenebis(cyclohexyl isocyanate) norbornane diisocyanate, and 3,3,5-trimethyl-1-isocyanato-3-isocyanatomethylcyclohexane.

8. The radiation-curable thermally conditioned formulation as claimed in claim 7, comprising at least one of an isocyanurate, an uretdione, and a polyisocyanate comprising at least one biuret or allophanate group.

9. The radiation-curable thermally conditioned formulation as claimed in claim 1, comprising as component B) at least one acrylate- or methacrylate-containing component which is liquid at room temperature.

10. The radiation-curable thermally conditioned formulation as claimed in claim 1, comprising as component C) at least one reaction product of at least one phosphoric acid and at least one alcohol-functionalized acrylate or methacrylate.

11. The radiation-curable thermally conditioned formulation as claimed in claim 1, comprising as component F) at least one of a flow control agent, a matting agent, a devolatilizer, and an adjuvant.

12. A process for preparing a solid radiation-curable thermally conditioned formulation comprising:
obtaining a mixture comprising:
A) at least one acrylate-substituted radiation-curable resin, wherein the acrylate is at least one (meth)acrylate group selected from the group consisting of ethyl acrylate, propyl acrylate, butyl acrylate, and glycidyl acrylate,
B) at least one radiation-curable reactive diluent,
C) at least one adhesion promoter containing phosphoric acid,
D) at least one UV photoinitiator,
E) optionally at least one pigment,
F) optionally at least one adjuvant,
thermally conditioning the mixture as a solid at a temperature of from 40 to 60° C. for from 2 to 8 hours, and
applying and curing the thermally conditioned mixture on a substrate.

13. The process as claimed in claim 12, wherein components A) to F) are mixed in a stirred tank, static mixer, extruder or flow tube.

14. The process as claimed in claim 12, wherein thermal conditioning takes place either in the whole formulation or in ingredients of said formulation comprising the adhesion promoter containing phosphoric acid.

15. A coating on a metal surface, comprising the radiation-curable thermally conditioned formulation as claimed in claim 1.

16. The radiation-curable thermally conditioned formulation as claimed in claim 1, comprising:

A) from 5% to 95% by weight of the at least one radiation-curable resin,
B) from 5% to 90% by weight of the at least one radiation-curable reactive diluent,
C) from 0.1% to 10% by weight of the at least one adhesion promoter comprising phosphoric acid,
D) from 0.2% to 10% by weight of the at least one UV photoinitiator,
E) optionally from 0.01% to 5% by weight of the at least one pigment, and
F) optionally from 0.01% to 5% by weight of the at least one adjuvant.

17. A solid radiation-curable thermally conditioned formulation comprising:
A) at least one radiation-curable urethane polyester acrylate comprised of a hydroxyl-containing polyester to which urethane groups and acrylate groups are attached by reaction with polyisocyanates and acrylate-containing alcohols, and comprising polymerized units of at least one first monomer compound having at least one free OH group and at least one second monomer compound selected from the group consisting of hydroxyethyl acrylate, hydroxypropyl acrylate and glyceryl diacrylate;
B) at least one radiation-curable reactive diluent,
C) at least one adhesion promoter comprising phosphoric acid,
D) at least one UV photoinitiator,
E) optionally at least one pigment,
F) optionally at least one adjuvant,
wherein said radiation-curable formulation is obtained by thermally conditioning the solid formulation at a temperature of from 40 to 60° C. for from 2 to 8 hours, prior to application and curing.

18. A process for preparing a radiation-curable thermally conditioned formulation comprising:
obtaining a mixture comprising:
A) at least one radiation-curable urethane polyester acrylate comprised of a hydroxyl-containing polyester to which urethane groups and acrylate groups are attached by reaction with polyisocyanates and acrylate-containing alcohols, and comprising polymerized units of at least one first monomer compound having at least one free OH group and at least one second monomer compound selected from the group consisting of hydroxyethyl acrylate, hydroxypropyl acrylate and glyceryl diacrylate;
B) at least one radiation-curable reactive diluent,
C) at least one adhesion promoter containing phosphoric acid,
D) at least one UV photoinitiator,
E) optionally at least one pigment,
F) optionally at least one adjuvant,
thermally conditioning the mixture as a solid at a temperature of from 40 to 60° C. for from 2 to 8 hours, and
applying and curing the thermally conditioned mixture on a substrate.

19. A radiation-curable thermally conditioned formulation, comprising:
A) at least one radiation-curable resin,
B) at least one radiation-curable reactive diluent,
C) at least one adhesion promoter comprising phosphoric acid,
D) at least one UV photoinitiator,
wherein the radiation-curable formulation has been thermally conditioned as a solid at a temperature of from 40 to 60° C. for from 2 to 8 hours.

20. The radiation-curable thermally conditioned formulation as claimed in claim 19, wherein the acrylate-substituted radiation-curable resin is a urethane polyester acrylate A) prepared from at least one polyester having an OH number of from 15 to 750 mg KOH/g.

21. The radiation-curable thermally conditioned formulation as claimed in claim 19, comprising at least one polyester synthesized from succinic, adipic, suberic, azelaic, sebacic, phthalic, terephthalic, isophthalic, trimellitic, pyromellitic, tetrahydrophthalic, hexahydrophthalic, hexahydroterephthalic, dichlorophthalic, tetrachlorophthalic, endomethylenetetrahydrophthalic, glutaric acid, 1,4-cyclohexanedicarboxylic acid, an anhydride of the acid and an ester of the acid.

22. The radiation-curable thermally conditioned formulation as claimed in claim 21, comprising isophthalic acid, terephthalic acid, hexahydroterephthalic acid and 1,4-cyclohexanedicarboxylic acid.

23. The radiation-curable thermally conditioned formulation as claimed in claim 19, comprising at least one polyester synthesized from monoethylene glycol, 1,2-propylene glycol, 1,3-propylene glycol, 1,4-butylene glycol, 2,3-butylene glycol, di-β-hydroxyethylbutanediol, 1,5-pentanediol, 1,6-hexanediol, 1,8-octanediol, decanediol, dodecanediol, neopentyl glycol, cyclohexanediol, 3(4),8(9)-bis(hydroxymethyl)tricyclo[5.2.1.0$^{2,6}$]decane, 1,4-bis(hydroxymethyl)cyclohexane, 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, glycerol, trimethylolpropane, trimethylolethane, hexane-1,2,6-triol, butane-1,2,4-triol, tris(β-hydroxyethyl) isocyanurate, pentaerythritol, mannitol, sorbitol, and also diethylene glycol, triethylene glycol, tetraethylene glycol, dipropylene glycol, a polypropylene glycol, a polybutylene glycol, a xylylene glycol, and neopentyl glycol hydroxypivalate.

24. The radiation-curable thermally conditioned formulation as claimed in claim 23, wherein the polyester is synthesized from at least one of monoethylene glycol, neopentyl glycol, 3(4),8(9)-bis(hydroxymethyl)tricyclo[5.2.1.0$^{2,6}$]decane, cyclohexanedimethanol, trimethylolpropane and glycerol.

25. The radiation-curable thermally conditioned formulation as claimed in claim 19, wherein the acrylate-substituted radiation-curable resin is a urethane polyester acrylate A) prepared from at least one diisocyanate selected from the group consisting of 2 methylpentamethylene 1,5-diisocyanate, hexamethylene diisocyanate trimethylhexamethylene 1,6-diisocyanate, 4,4'-methylenebis(cyclohexyl isocyanate) norbornane diisocyanate, and 3,3,5-trimethyl-1-isocyanato-3-isocyanatomethylcyclohexane.

26. The radiation-curable thermally conditioned formulation as claimed in claim 25, comprising at least one of an isocyanurate, an uretdione, and a polyisocyanate comprising at least one biuret or allophanate group.

27. The radiation-curable thermally conditioned formulation as claimed in claim 19, comprising as component B) at least one acrylate- or methacrylate-containing component which is liquid at room temperature.

28. The radiation-curable thermally conditioned formulation as claimed in claim 19, comprising as component C) at least one reaction product of at least one phosphoric acid and at least one alcohol-functionalized acrylate or methacrylate.

29. The radiation-curable thermally conditioned formulation as claimed in claim 19, comprising as component F) at least one of a flow control agent, a matting agent, a devolatilizer, and an adjuvant.

30. A radiation-curable thermally conditioned formulation, comprising:

A) at least one radiation-curable resin,
B) at least one radiation-curable reactive diluent,
C) at least one adhesion promoter comprising phosphoric acid,
wherein the radiation-curable formulation has been thermally conditioned as a solid at a temperature of from 40 to 60° C. for from 2 to 8 hours prior to application and curing.

31. The radiation-curable thermally conditioned formulation of claim 30, wherein the radiation-curable resin consists of an acrylate portion, a urethane portion and a polyester portion.

32. The radiation-curable thermally conditioned formulation of claim 1, wherein a cured coating obtained by curing the radiation-curable formulation has a subfilm corrosion of 1.1-3.5 mm according to DIN 53167.

33. The radiation-curable thermally conditioned formulation of claim 30, wherein a cured coating obtained by curing the radiation-curable thermally conditioned formulation has a subfilm corrosion of 1.1-3.5 mm according to DIN 53167.

34. The solid radiation-curable thermally conditioned formulation as claimed in claim 1, wherein a cured coating obtained by curing the radiation-curable thermally conditioned formulation has a subfilm corrosion according to DIN 53167 that is from 5.1 to 12 mm less than the subfilm corrosion of a comparative radiation-curable formulation that is the same as the solid radiation-curable thermally conditioned formulation except without the thermal conditioning.

35. The process as claimed in claim 12, wherein a cured coating obtained by curing the radiation-curable thermally conditioned formulation has a subfilm corrosion according to DIN 53167 that is from 5.1 to 12 mm less than the subfilm corrosion of a comparative radiation-curable formulation that is the same as the solid radiation-curable thermally conditioned formulation except without the thermal conditioning.

36. The solid radiation-curable thermally conditioned formulation as claimed in claim 17, wherein a cured coating obtained by curing the radiation-curable thermally conditioned formulation has a subfilm corrosion according to DIN 53167 that is from 5.1 to 12 mm less than the subfilm corrosion of a comparative radiation-curable formulation that is the same as the solid radiation-curable thermally conditioned formulation except without the thermal conditioning.

37. The process as claimed in claim 18, wherein a cured coating obtained by curing the radiation-curable thermally conditioned formulation has a subfilm corrosion according to DIN 53167 that is from 5.1 to 12 mm less than the subfilm corrosion of a comparative radiation-curable formulation that is the same as the solid radiation-curable thermally conditioned formulation except without the thermal conditioning.

38. The solid radiation-curable thermally conditioned formulation as claimed in claim 19, wherein a cured coating obtained by curing the radiation-curable thermally conditioned formulation has a subfilm corrosion according to DIN 53167 that is from 5.1 to 12 mm less than the subfilm corrosion of a comparative radiation-curable formulation that is the same as the solid radiation-curable thermally conditioned formulation except without the thermal conditioning.

39. The solid radiation-curable thermally conditioned formulation as claimed in claim 30, wherein a cured coating obtained by curing the radiation-curable thermally conditioned formulation has a subfilm corrosion according to DIN 53167 that is from 5.1 to 12 mm less than the subfilm corrosion of a comparative radiation-curable formulation that is the same as the solid radiation-curable thermally conditioned formulation except without the thermal conditioning.

* * * * *